(12) United States Patent
Lee (10) Patent No.: US 11,060,727 B2
(45) Date of Patent: Jul. 13, 2021

(54) FUEL NOZZLE ASSEMBLY AND GAS TURBINE INCLUDING THE SAME

(71) Applicant: DOOSAN HEAVY INDUSTRIES & CONSTRUCTION CO., LTD., Changwon-si (KR)

(72) Inventor: Jonghwa Lee, Anyang-si (KR)

(*) Notice: Subject to any disclaimer, the term of this patent is extended or adjusted under 35 U.S.C. 154(b) by 238 days.

(21) Appl. No.: 16/159,692

(22) Filed: Oct. 14, 2018

(65) Prior Publication Data

US 2019/0128526 A1 May 2, 2019

(30) Foreign Application Priority Data

Oct. 30, 2017 (KR) .......................... 10-2017-0142541

(51) Int. Cl.
*F23R 3/28* (2006.01)
*F02C 3/04* (2006.01)

(52) U.S. Cl.
CPC ................. *F23R 3/283* (2013.01); *F02C 3/04* (2013.01); *F05D 2220/32* (2013.01);
(Continued)

(58) Field of Classification Search
CPC .. F23R 3/283; F23R 3/286; F23R 3/60; F23R 2900/00001; F23R 2900/00005; F23R 2900/00017; F05D 2260/30; F05D 2260/31; F05D 2260/941; F05D 2230/642; F05D 2230/644; F16B 35/00; F16B 39/24; F16B 39/26; F16B 43/00; F16B 43/001; F16B 43/002; F16B 43/009; F02M 61/168
See application file for complete search history.

(56) References Cited

U.S. PATENT DOCUMENTS 3,009,176 A * 11/1961 Knocke ................. F16B 41/002
    470/4
4,322,945 A * 4/1982 Peterson ................. F23R 3/283
    60/740
(Continued)

FOREIGN PATENT DOCUMENTS

JP  H04-129924 U   11/1992
JP  H05-215338 A    8/1993
(Continued)

OTHER PUBLICATIONS

A Korean Office Action dated Jan. 30, 2019 in connection with Korean Patent Application No. 10-2017-0142541 which corresponds to the above-referenced U.S. application.

*Primary Examiner* — Alain Chau (57) ABSTRACT

Disclosed herein are a fuel nozzle assembly and a gas turbine including the same. The fuel nozzle assembly includes a fuel nozzle, a head end plate to which the fuel nozzle is fixedly fastened, and a nozzle casing to which the head end plate is fixed. The fuel nozzle includes an injection cylinder having a nozzle flange fixed to the head end plate, and a nozzle shroud surrounding the injection cylinder and forming a passage between its inner wall and the injection cylinder. The injection cylinder is fastened to the head end plate by a plurality of fixing bolts arranged in a circumferential direction of the nozzle flange. Each of the fixing bolts is fitted to a pressure plate, which extends in the circumferential direction of the nozzle flange and is pressed against a flat surface thereof, to fasten the injection cylinder to the head end plate.

20 Claims, 10 Drawing Sheets

(52) U.S. Cl.
CPC ...... *F05D 2240/35* (2013.01); *F05D 2260/30* (2013.01); *F23R 2900/00017* (2013.01)

(56) References Cited

U.S. PATENT DOCUMENTS

| | | | | |
|---|---|---|---|---|
| 5,273,249 | A * | 12/1993 | Peterson | F02C 7/20 248/550 |
| 5,829,933 | A * | 11/1998 | Kramer | F16B 39/24 411/156 |
| 6,412,272 | B1 * | 7/2002 | Titterton, III | F23R 3/283 60/39.37 |
| 6,672,073 | B2 * | 1/2004 | Wiebe | F23R 3/283 60/747 |
| 6,824,225 | B2 * | 11/2004 | Stiffler | E21C 35/197 299/104 |
| 7,017,334 | B2 * | 3/2006 | Mayer | F23R 3/60 60/266 |
| 7,546,743 | B2 * | 6/2009 | Bui man | F23R 3/007 60/753 |
| 7,581,402 | B2 * | 9/2009 | Parker | F23R 3/14 60/748 |
| 7,762,076 | B2 * | 7/2010 | Shi | F23R 3/60 60/753 |
| 8,122,721 | B2 * | 2/2012 | Johnson | F23R 3/286 60/742 |
| 8,505,311 | B2 * | 8/2013 | DesChamps | F02C 7/28 60/796 |
| 8,800,298 | B2 * | 8/2014 | Ladd | F23R 3/60 60/792 |
| 9,200,571 | B2 * | 12/2015 | Bailey | F23R 3/286 |
| 9,322,558 | B2 * | 4/2016 | Ramier | F23R 3/283 |
| 9,366,445 | B2 * | 6/2016 | Stoia | F23R 3/60 |
| 9,702,395 | B2 * | 7/2017 | Harger | F16B 43/00 |
| 9,850,937 | B2 * | 12/2017 | Hatcher, Jr. | F02C 7/32 |
| 10,125,634 | B2 * | 11/2018 | Merlau | F01D 25/28 |
| 10,429,073 | B2 * | 10/2019 | Davis, III | F23R 3/283 |
| 10,571,128 | B2 * | 2/2020 | Jorgensen | F23R 3/002 |
| 2003/0118399 | A1 * | 6/2003 | Schilling | F16B 39/10 403/337 |
| 2003/0217556 | A1 * | 11/2003 | Wiebe | F23R 3/286 60/796 |
| 2006/0174631 | A1 * | 8/2006 | Parker | F23R 3/283 60/796 |
| 2008/0010990 | A1 * | 1/2008 | Shi | F16L 25/0072 60/772 |
| 2009/0111063 | A1 * | 4/2009 | Boardman | F23R 3/36 431/8 |
| 2010/0024425 | A1 * | 2/2010 | Cihlar | F23R 3/283 60/734 |
| 2011/0005230 | A1 * | 1/2011 | Bailey | F23R 3/286 60/738 |
| 2015/0000283 | A1 * | 1/2015 | Ramier | F23R 3/60 60/740 |
| 2015/0040579 | A1 * | 2/2015 | Melton | F23R 3/283 60/796 |
| 2015/0345792 | A1 * | 12/2015 | Carlson | F23R 3/283 60/796 |
| 2016/0146460 | A1 * | 5/2016 | Stewart | F23D 17/00 60/737 |
| 2016/0369760 | A1 * | 12/2016 | Jin | F23R 14/48 |
| 2017/0002743 | A1 * | 1/2017 | Jorgensen | F23R 3/36 |
| 2017/0167297 | A1 * | 6/2017 | Merlau | F01D 25/28 |
| 2017/0176016 | A1 * | 6/2017 | Davis, III | F23R 3/60 |
| 2017/0191669 | A1 * | 7/2017 | Oswald | F23R 3/50 |
| 2017/0350599 | A1 * | 12/2017 | Jangid | F23R 3/60 |
| 2018/0031243 | A1 * | 2/2018 | Kamoi | F23R 3/002 |
| 2018/0031245 | A1 * | 2/2018 | Kamoi | F23R 3/60 |
| 2018/0283687 | A1 * | 10/2018 | Propheter-Hinckley | F23R 3/60 |

FOREIGN PATENT DOCUMENTS

| | | |
|---|---|---|
| JP | 2012-127455 A | 7/2012 |
| JP | 2012-149881 A | 8/2012 |
| JP | 2012-163150 A | 8/2012 |
| JP | 2015-145709 A | 8/2015 |
| KR | 20-1997-0042403 U | 7/1997 |
| KR | 1998-0037977 A | 8/1998 |
| KR | 10-1028474 B1 | 4/2011 |

* cited by examiner

FIG. 14

FUEL NOZZLE ASSEMBLY AND GAS TURBINE INCLUDING THE SAME

CROSS-REFERENCE TO RELATED APPLICATION(S)

This application claims priority to Korean Patent Application No. 10-2017-0142541, filed on Oct. 30, 2017, the disclosure of which is incorporated herein by reference in its entirety.

BACKGROUND OF THE INVENTION

Field of the Invention

Exemplary embodiments of the present disclosure relate to a fuel nozzle assembly and a gas turbine including the same.

Description of the Related Art

A gas turbine is a power engine that combusts a mixture of fuel and compressed air coming out from a compressor to produce hot gas and rotates a turbine by the hot gas, and is used for combined thermal power generation, cogeneration, and the like.

Such gas turbine may generally include a compressor, a combustor, and a turbine. The compressor serves to be supplied with some of the power generated by the rotation of the turbine to compress air introduced thereinto to a high pressure, and to transmit the compressed air to the combustor.

The combustor mixes and combusts the compressed air and fuel to generate a flow of hot combustion gas and injects it into the turbine, which rotates by the combustion gas injected thereinto to obtain a rotational force. The combustor used for an industrial gas turbine includes a plurality of fuel nozzles arranged in an annular form, and air and fuel are mixed in the fuel nozzles.

Compressed air is introduced from the compressor to the combustor, and fuel is injected through swirlers arranged at each of the fuel nozzles to be mixed with air. A mixture of fuel and air is burned in a combustion chamber located downstream of the fuel nozzles, and combustion gas is discharged to a passage connected to the turbine.

Injection cylinders of the respective fuel nozzles are fixedly fastened to a head end plate through nozzle flanges, and the head end plate is fixedly fastened to a nozzle casing by bolts, thereby forming a fuel nozzle assembly.

SUMMARY OF THE INVENTION

An object of the present disclosure is to provide a fuel nozzle assembly, and a gas turbine including the same, having increased durability and stability by improving the mechanical properties of the fuel nozzle assembly through a structure in which a nozzle flange is fastened to a head end plate.

Other objects and advantages of the present disclosure can be understood by the following description, and will become apparent with reference to the embodiments of the present disclosure. Also, it can be clear to those skilled in the art to which the present disclosure pertains that the objects and advantages of the present disclosure can be realized by the means as claimed and combinations thereof.

In accordance with one aspect of the present disclosure, a fuel nozzle assembly includes a fuel nozzle, a head end plate to which the fuel nozzle is fixedly fastened, and a nozzle casing to which the head end plate is fixed. The fuel nozzle includes an injection cylinder that supplies fuel to a combustion chamber and having a nozzle flange fixed to the head end plate, and a nozzle shroud separated from the injection cylinder to surround the injection cylinder and forming a passage between its inner wall and the injection cylinder. The injection cylinder is fixedly fastened to the head end plate by a plurality of fixing bolts arranged in a circumferential direction of the nozzle flange. Each of the fixing bolts is fitted to a pressure plate, which extends in the circumferential direction of the nozzle flange and is pressed against a flat surface of the nozzle flange, to fixedly fasten the injection cylinder to the head end plate.

In the fuel nozzle assembly according to the aspect of the present disclosure, the nozzle flange may have a recess portion formed on the flat surface thereof such that the pressure plate is accommodated in the recess portion.

In the fuel nozzle assembly according to the aspect of the present disclosure, the pressure plate may be an extension pressure plate extending such that an adjacent fixing bolt is fitted thereto. The nozzle flange may have a recess portion formed on the flat surface thereof such that the extension pressure plate is accommodated in the recess portion.

In the fuel nozzle assembly according to the aspect of the present disclosure, the pressure plate may be bent in its width direction to have an arc-like cross-section. Alternatively, the pressure plate may be bent in its longitudinal direction to have an arc-like cross-section.

In the fuel nozzle assembly according to the aspect of the present disclosure, the nozzle flange may have a recess portion formed on the flat surface thereof such that the pressure plate is accommodated in the recess portion, the pressure plate may be bent in its width direction to have an arc-like cross-section, and the recess portion may have a width equal to or greater than the pressure plate in its flattened state caused by a pressing force of an associated one of the fixing bolts. Alternatively, the nozzle flange may have a recess portion formed on the flat surface thereof such that the pressure plate is accommodated in the recess portion, the pressure plate may be bent in its longitudinal direction to have an arc-like cross-section, and the recess portion may have a length equal to or greater than the pressure plate in its flattened state caused by a pressing force of an associated one of the fixing bolts.

In the fuel nozzle assembly according to the aspect of the present disclosure, the pressure plate may be an extension pressure plate extending such that an adjacent fixing bolt is fitted thereto, and the extension pressure plate may have a bent portion that is convex upward at the center thereof between two holes into which two adjacent fixing bolts are fitted.

In the fuel nozzle assembly according to the aspect of the present disclosure, the pressure plate may have a plurality of circular protrusions formed on the surface that is pressed against the nozzle flange.

In the fuel nozzle assembly according to the aspect of the present disclosure, the pressure plate may have a plurality of square protrusions formed on the surface thereof pressed against the nozzle flange.

In the fuel nozzle assembly according to the aspect of the present disclosure, the fuel nozzle may include an inner fuel nozzle disposed at the center of the head end plate, and a plurality of outer fuel nozzles arranged radially around the inner fuel nozzle.

In the fuel nozzle assembly according to the aspect of the present disclosure, the fuel nozzle may include an inner fuel nozzle disposed at the center of the head end plate, and a plurality of outer fuel nozzles arranged radially around the inner fuel nozzle, and the outer fuel nozzles may be different-sized modules that are circumferentially arranged. The different-sized modules as the outer fuel nozzles may be disposed at different radial positions from the center of the head end plate.

In accordance with another aspect of the present disclosure, a gas turbine includes a compressor to compress air, a combustor including a fuel nozzle assembly to mix compressed air supplied from the compressor with fuel for combustion, and a turbine to generate power by gas combusted in the combustor. The fuel nozzle assembly includes a fuel nozzle, a head end plate to which the fuel nozzle is fixedly fastened, and a nozzle casing to which the head end plate is fixed. The fuel nozzle includes an injection cylinder that supplies fuel to a combustion chamber and having a nozzle flange fixed to the head end plate, and a nozzle shroud separated from the injection cylinder to surround the injection cylinder and forming a passage between its inner wall and the injection cylinder. The injection cylinder is fixedly fastened to the head end plate by a plurality of fixing bolts arranged in a circumferential direction of the nozzle flange. Each of the fixing bolts is fitted to a pressure plate, which extends in the circumferential direction of the nozzle flange and is pressed against a flat surface of the nozzle flange, to fixedly fasten the injection cylinder to the head end plate.

In the gas turbine according to the aspect of the present disclosure, the fuel nozzle may include an inner fuel nozzle disposed at the center of the head end plate, and a plurality of outer fuel nozzles arranged radially around the inner fuel nozzle.

It is to be understood that both the foregoing general description and the following detailed description of the present disclosure are exemplary and are intended to provide further explanation of the features being claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Exemplary embodiments of the present disclosure will be described below in more detail with reference to the accompanying drawings.

In certain embodiments, detailed descriptions of configurations well known by those skilled in the art will be omitted to avoid obscuring of the inventive features. Regarding the reference numerals assigned to the elements in the drawings, it should be noted that the same elements will be specified by the same reference numerals, wherever possible, even though they are illustrated in different drawings. It should be considered that the thickness of each line or the size of each component in the drawings may be exaggeratedly illustrated for clarity and convenience of description.

Terms such as "first", "second", "A", "B", "(a)", and "(b)" may be used herein to describe components in the embodiments of the present disclosure. These terms are not used to define an essence, order or sequence of a corresponding component but used merely to distinguish the corresponding component from other component(s). It will be understood that, when an element is referred to as being "connected", "coupled", or "joined" to another element, not only can it be directly "connected", "coupled", or "joined" to the other element, but also can it be indirectly "connected", "coupled", or "joined" to the other element with other elements being interposed therebetween.

The thermodynamic cycle of a gas turbine ideally follows the Brayton (thermodynamic) cycle. The Brayton cycle consists of four phases including isentropic compression (adiabatic compression), isobaric heat addition, isentropic expansion (adiabatic expansion), and isobaric heat dissipation. In other words, in the Brayton cycle, thermal energy is released by combustion of fuel in an isobaric environment after atmospheric air is sucked in and compressed to a high pressure, hot combustion gas is expanded to be converted into kinetic energy, and exhaust gas with residual energy is then discharged to the atmosphere. The Brayton cycle consists of four processes, i.e., compression, heating, expansion, and exhaust.

Figure 1:
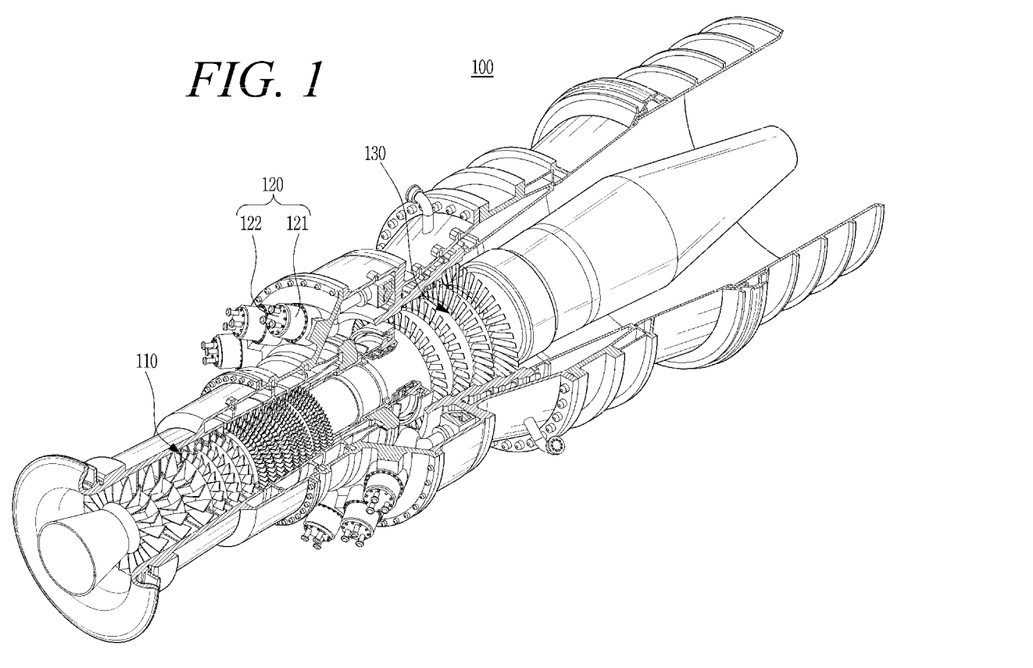
FIG. 1 is a view schematically illustrating a configuration of a gas turbine using a fuel nozzle assembly according to an embodiment of the present disclosure.

The gas turbine using the above Brayton cycle includes a compressor, a combustor, and a turbine. FIG. 1 is a partial cross-sectional perspective view schematically illustrating a gas turbine using a fuel nozzle assembly according to an embodiment of the present disclosure. Although the following description is given with reference to FIG. 1, the present disclosure may be widely applied to a gas turbine having the same or similar configuration as the gas turbine 100 exemplarily illustrated in FIG. 1.

A compressor 110 of the gas turbine 100 serves to suck in (i.e. receive air intake) and compress air, and mainly serves to supply cooling air to a high-temperature region required for cooling in the gas turbine 100 while supplying combustion air to a combustor 120. Since the air sucked into the compressor 110 is subject to an adiabatic compression process therein, the pressure and temperature of the air passing through the compressor 110 increase.

The compressor 110 included in the gas turbine 100 is typically designed as a centrifugal compressor or an axial compressor. In general, the centrifugal compressor is applied to a small gas turbine, whereas a multistage axial compressor 110 is applied to the large gas turbine 100 illustrated in FIG. 1 because it is necessary to compress a large amount of air. The rotary shaft of the compressor 110 is directly connected to the rotary shaft of a turbine 130, and the compressor 110 is thus driven using a portion of the power output from the turbine 130.

Figure 2:
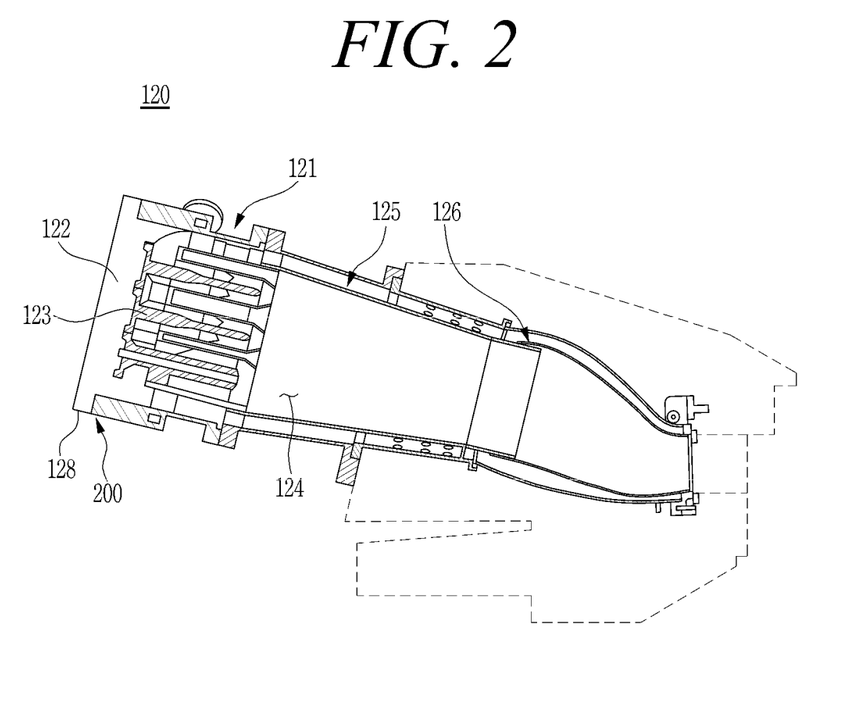
FIG. 2 is a cross-sectional view schematically illustrating a combustor including the fuel nozzle assembly according to the embodiment of the present disclosure.

The combustor 120 mixes the compressed air, which is supplied from the outlet of the compressor 110, with fuel for isobaric combustion to produce high-energy combustion gas. FIG. 2 is a cross-sectional view schematically illustrating the combustor including the fuel nozzle assembly according to the embodiment of the present disclosure. The combustor 120 is disposed downstream of the compressor 110 and includes a plurality of burners 122 arranged along an annular nozzle casing 121. Each of the burners 122 includes a plurality of fuel nozzles 123, and the fuel supplied from the fuel nozzles 123 is mixed with air at an appropriate rate to be suitable for combustion.

The plurality of fuel nozzles 123 are fixedly fastened to a head end plate 128, the head end plate 128 is fixedly fastened to the nozzle casing 121, thereby forming a fuel nozzle assembly 200. In the following description with reference to FIGS. 3 to 14, the constituent fuel nozzle, head end plate, and nozzle casing of the fuel nozzle assembly 200 will be designated by reference numerals different from those of FIGS. 1 and 2.

The gas turbine 100 may use gas fuel, liquid fuel, or a composite fuel made of a combination thereof, and an amount of emission such as carbon monoxide or nitrogen oxide is strictly subject to legal regulations.

The combustion in the gas turbine 100 may be largely classified into diffusion combustion and pre-mixed combustion. The diffusion combustion is a method of gradually mixing only fuel injected from a fuel nozzle with air required for combustion, which is introduced by diffusion around a flame, and burning the mixture thereof. The diffusion combustion is advantageous in that combustion can be stably maintained since there is no risk of flash back (or back fire) and the combustion is easily controlled even though a combustion speed is slow and a flame temperature is low. The pre-mixed combustion is a method of mixing fuel and air in advance and then injecting a mixture thereof through a combustion nozzle for combustion. The pre-mixed combustion has characteristics opposite to those of the diffusion combustion.

It is important to make a combustion environment for reducing an amount of undesirable emissions of carbon monoxide or nitrogen oxide. Accordingly, the pre-mixed combustion is advantageous in that it can reduce a local high-temperature region, in which nitrogen oxide is generated, by making a combustion temperature uniform even though it is relatively difficult to control combustion. In recent years, the pre-mixed combustion has been increasingly used because it can minimize nitrogen oxide emissions, which are difficult to control.

In order to facilitate pre-mixing of air and fuel, there is known a technique that employs special components called swirlers that are placed around a combustion nozzle. When combustion reaches stability after the pre-mixed gas is initially ignited by an igniter, the combustion is maintained by the supply of fuel and air.

The combustor 120 needs to be suitably cooled since it operates at the highest temperature in the gas turbine 100. Referring to FIG. 2, compressed air flows along the outer surface of a duct assembly, which connects the burner 122 to the turbine 130 so that hot combustion gas flows through the duct assembly, comprised of a liner 125 and a transition piece 126, and is supplied to the fuel nozzles 123. In this process, the duct assembly heated by the hot combustion gas is properly cooled.

Each of the liner 125 and the transition piece 126 of the duct assembly has a double structure in which they have annular passages respectively formed by an inner liner and an outer liner and by an inner transition piece and an outer transition piece. Such double structure allows compressed air to penetrate into the annular passages to cool the liner 125 and the transition piece 126.

Since the respective ends of the liner 125 and the transition piece 126 are fixed to the combustor 120 and the turbine 130, an elastic support means (not shown) must have a structure that is capable of accommodating length and diameter elongation due to thermal expansion. Through this structure, the elastic support means may support the liner 125 and the transition piece 126.

The high-temperature and high-pressure combustion gas produced in the combustor 120 is supplied to the turbine 130 through the duct assembly. In the turbine 130, the thermal energy of the combustion gas is converted into mechanical energy to rotate a rotary shaft by applying impingement and reaction force to a plurality of blades radially arranged on the rotary shaft of the turbine 130 through the adiabatic expansion of the combustion gas. Some of the mechanical energy obtained from the turbine 130 is supplied as energy required for compression of air in the compressor, and the remainder is used as effective energy required for driving a generator to produce electric power or the like.

The gas turbine 100 is advantageous in that consumption of lubricant is extremely low due to the absence of mutual friction parts such as a piston-cylinder. Also, since the gas turbine 100 does not have any main reciprocating components, the amplitude, which is a characteristic of reciprocating machines, is greatly reduced and high-speed motion and operation are possible.

The thermal efficiency in the Brayton cycle is increased as a compression ratio related to compression of air becomes high and the temperature of combustion gas (i.e. the turbine inlet temperature) introduced in the isentropic expansion process becomes high. Therefore, gas turbine technology is being improved to increase the compression ratio and the temperature at the inlet of the turbine to thus improve thermal efficiency.

Figure 3:
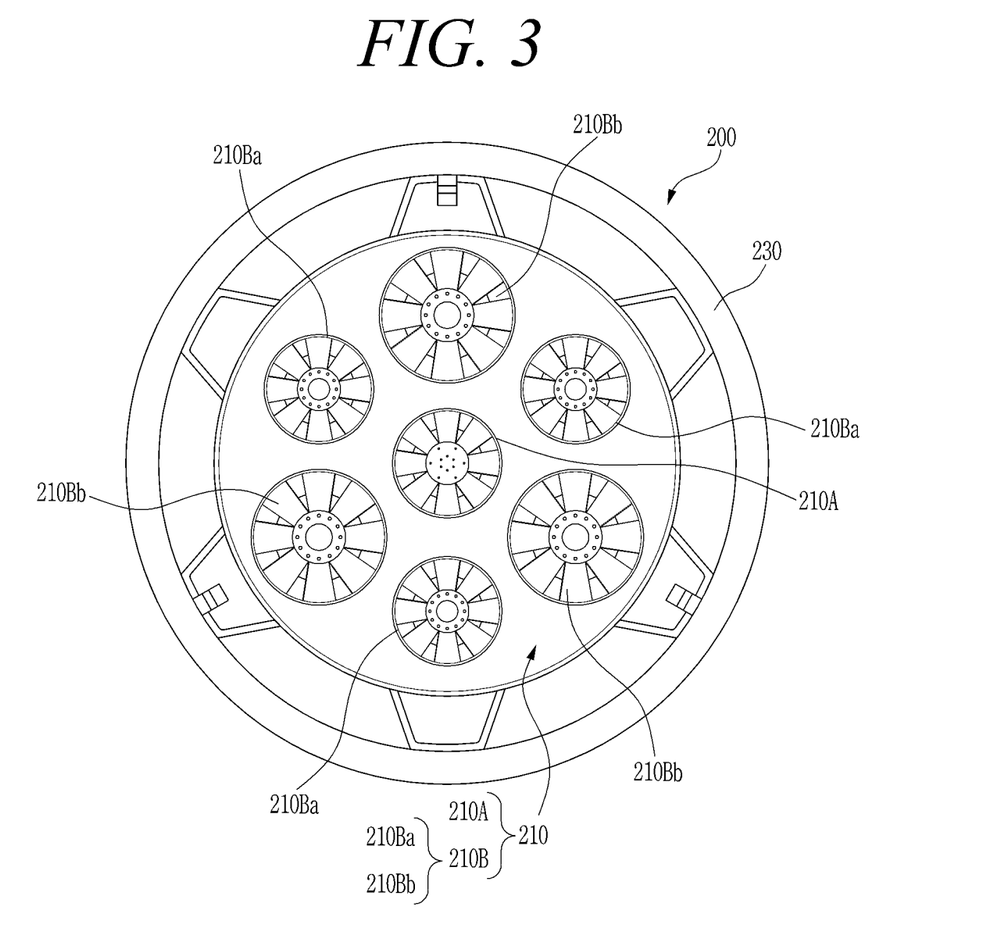
FIG. 3 is a view illustrating an arrangement configuration of fuel nozzles in the fuel nozzle assembly according to the embodiment of the present disclosure.
Figure 4:
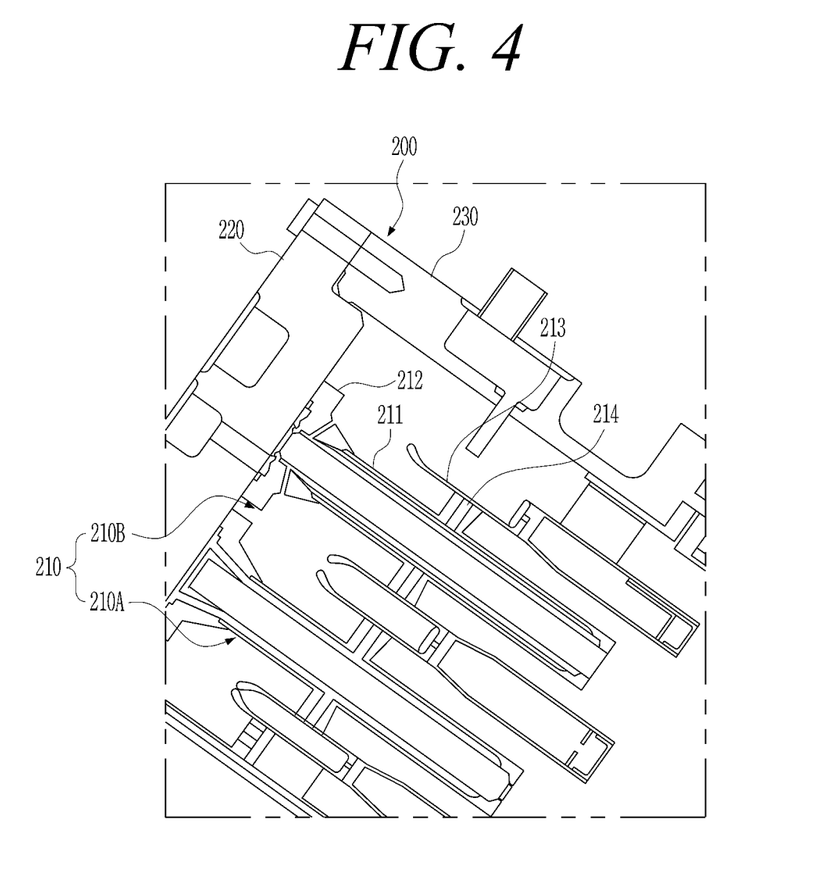
FIG. 4 is a cross-sectional view schematically illustrating a portion of the fuel nozzle assembly according to the embodiment of the present disclosure.
Figure 5:
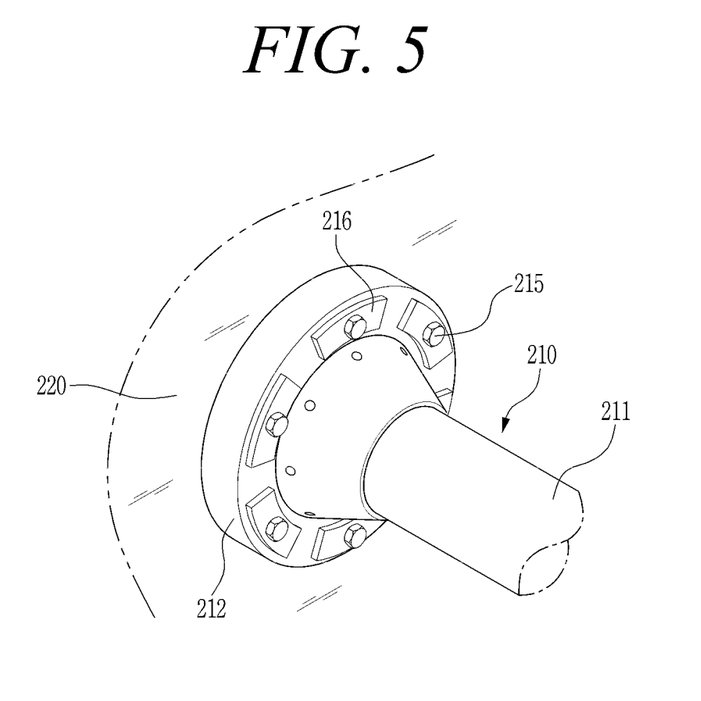
FIG. 5 is a perspective view illustrating a state in which one fuel nozzle is fixed to a head end plate in the fuel nozzle assembly according to the embodiment of the present disclosure.

FIG. 3 is a view illustrating an arrangement configuration of fuel nozzles in the fuel nozzle assembly according to embodiment(s) of the present disclosure. FIG. 4 is a cross-sectional view schematically illustrating a portion of the fuel nozzle assembly according to embodiment(s) of the present disclosure. FIG. 5 is a perspective view illustrating a state in which one fuel nozzle is fixed to the head end plate in the fuel nozzle assembly according to embodiment(s) of the present disclosure.

As illustrated in FIGS. 3 to 5, the fuel nozzle assembly 200 includes a fuel nozzle 210, a head end plate 220, and a nozzle casing 230.

The fuel nozzle 210 may include an injection cylinder 211 that supplies fuel to a combustion chamber 124 (see FIG. 2) and has a nozzle flange 212 fixed to the head end plate 220, a nozzle shroud 213 that is separated from and surrounds the injection cylinder 211 and forms a passage between the inner wall thereof and the injection cylinder 211. Swirlers 214 are provided in the passage between the injection cylinder 211 and the nozzle shroud 213.

The fuel nozzle 210 may include an inner fuel nozzle 210A disposed at the center of the head end plate 220, and a plurality of outer fuel nozzles 210B arranged radially around the inner fuel nozzle 210A. Here, the outer fuel nozzles 210B may be different-sized modules 210Ba and 210Bb that are circumferentially arranged. As can be seen in FIG. 3, the different-sized modules 210Ba and 210Bb as the outer fuel nozzles 210B may be disposed at different radial positions from the center of the head end plate 220.

As shown in FIG. 5, the fuel nozzle 210 is fixedly fastened to and is supported by the head end plate 220. The head end plate 220 is coupled to the end of the nozzle casing 230 to seal the nozzle casing 230, and may be coupled with a manifold, a related valve, or the like for supplying fuel to the injection cylinder 211. The head end plate 220 supports the fuel nozzle 210 disposed in the nozzle casing 230.

The injection cylinder 211 is fixedly fastened to the head end plate 220 by a plurality of fixing bolts 215 arranged in the circumferential direction of the nozzle flange 212. Each of the fixing bolts 215 is fitted to a pressure plate 216, which extends in the circumferential direction of the nozzle flange 212 and is pressed against the flat surface of the nozzle flange 212, to fixedly fasten the injection cylinder 211 to the head end plate 220.

The nozzle casing 230 forms the outer wall of the fuel nozzle assembly 200, has a space therein, and extends in one direction. The nozzle casing 230 typically has a cylindrical shape, and the embodiment of the present disclosure also exemplifies a cylindrical nozzle casing 230. The head end plate 220 is fixed to the end side of the nozzle casing 230 by fastening bolts.

In the fuel nozzle assembly 200 according to the embodiment(s) of the present disclosure, the pressure plates 216, which are arranged in the circumferential direction of the nozzle flange 212 of the injection cylinder 211, are pressed against the flat surface of the nozzle flange 212, and the injection cylinder 211 are fixedly fastened by the fixing bolts 215. Therefore, the nozzle flange 212 may be fastened to the head end plate 220 with a uniform pressing pressure. Thus, it is possible to enhance the durability and stability of the fuel nozzle assembly 200 by improving the mechanical properties (stress, strain, etc.) thereof.

Figure 6:
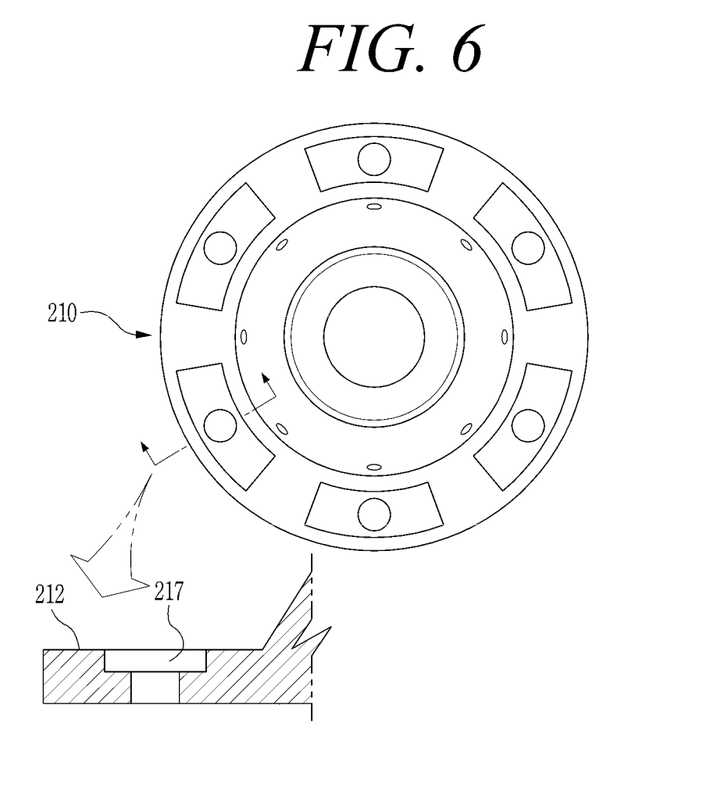
FIG. 6 is a view illustrating a bolt fastening surface of a nozzle flange in the fuel nozzle assembly according to the embodiment of the present disclosure.

FIG. 6 is a view illustrating the bolt fastening surface of the nozzle flange in the fuel nozzle assembly according to the embodiment(s) of the present disclosure.

As illustrated in FIG. 6, the nozzle flange 212 of the fuel nozzle 210 may have a recess portion 217 formed on the flat surface (i.e. a bolt fastening surface) thereof such that the associated pressure plate can be accommodated in the recess portion 217. The recess portion 217 may be a groove or depression that is substantially recessed to a depth that is similar or equal to a thickness of the pressure plate, and the recess portion 217 may have a hole formed at the center thereof for insertion of an associated bolt or other connector.

Figure 7:
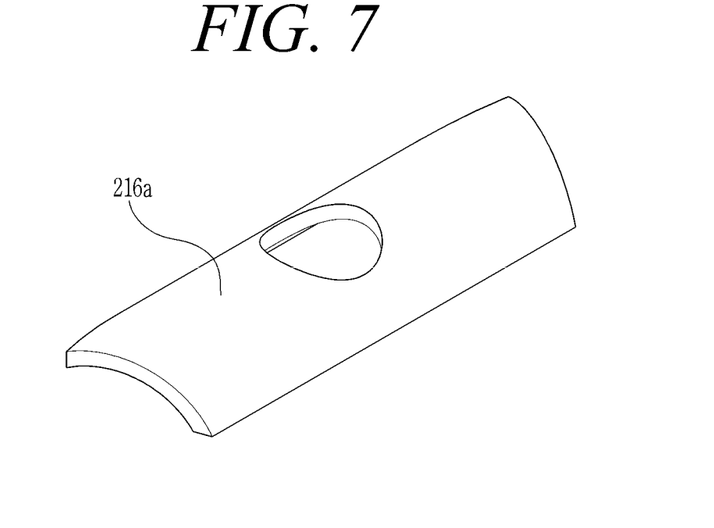
FIGS. 7 and 8 are perspective views illustrating a modified example of a pressure plate in the fuel nozzle assembly according to the embodiment of the present disclosure.
Figure 8:
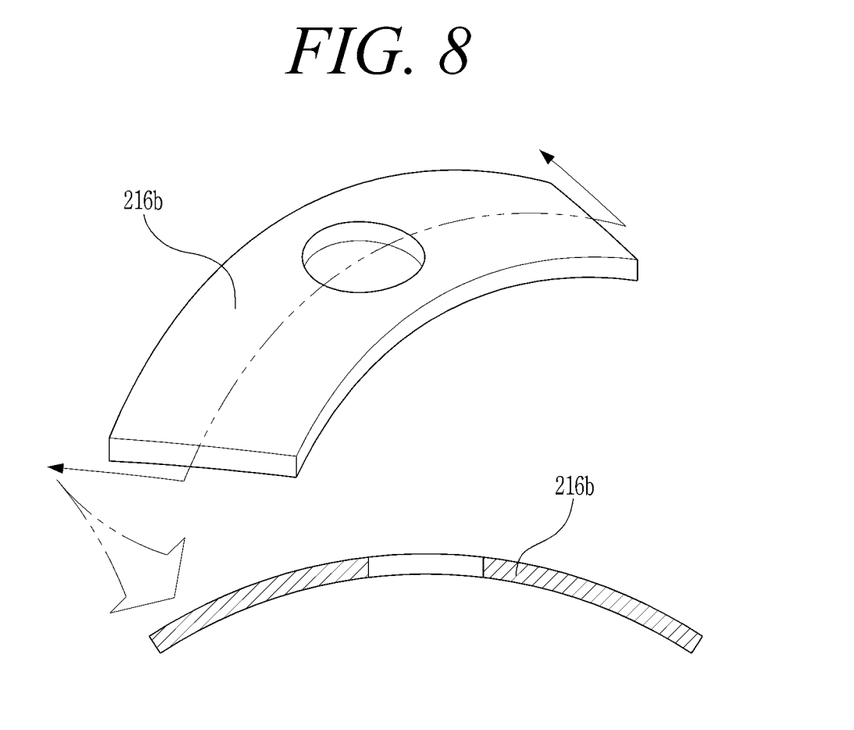

FIGS. 7 and 8 are perspective views illustrating a modified example of the pressure plate in the fuel nozzle assembly according to the embodiment(s) of the present disclosure.

As illustrated in FIG. 7, a pressure plate 216a may be bent in the width direction thereof to have an arc-like cross-section. In addition, as illustrated in FIG. 8, a pressure plate 216b may be bent in the longitudinal direction thereof to have an arc-like cross-section. Each of the pressure plates 216a and 216b has a hole or opening formed at the center thereof to receive a bolt or other connector. The pressure plate 216a or 216b is bent or curved to have the arc cross-section is pressed (or secured) at the center thereof by the fixing bolt fastened thereto, with the consequence that the pressure plate 216a or 216b is unfolded (or flexed) to be pressed against the bolt fastening surface of the nozzle flange. Accordingly, since a pressure is first applied to a surface apart from the bolt, a pressing pressure may be more uniformly applied between adjacent bolts.

Figure 9:
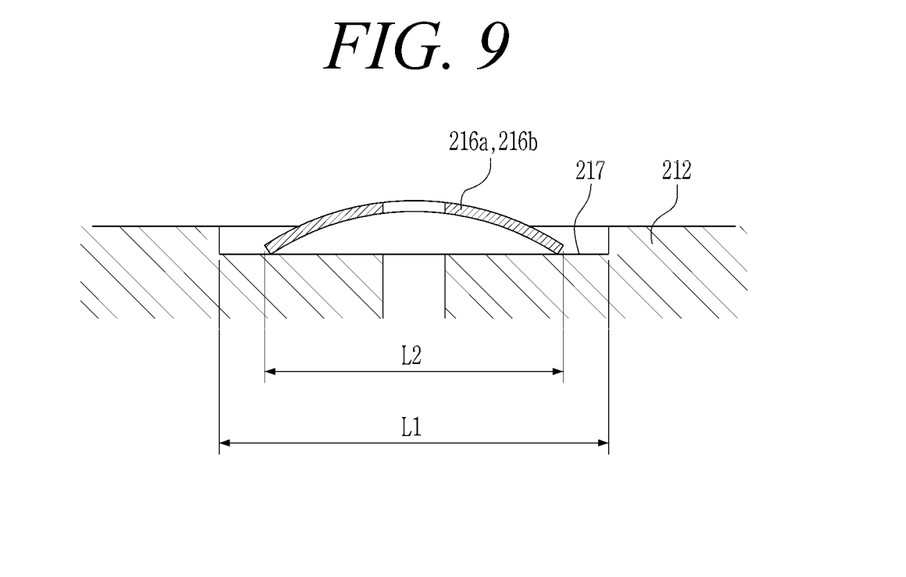
FIG. 9 is a cross-sectional view illustrating a state in which the pressure plate is accommodated in a recess portion of the nozzle flange in the fuel nozzle assembly according to the embodiment of the present disclosure.

FIG. 9 is a cross-sectional view illustrating a state in which the pressure plate is accommodated in the recess portion of the nozzle flange in the fuel nozzle assembly according to the embodiment(s) of the present disclosure.

As illustrated in FIG. 9, the nozzle flange 212 has a recess portion 217 formed on the flat surface thereof such that the pressure plate 216a or 217b can be accommodated in the recess portion 217, and the pressure plate 216a or 217b is bent in the width direction or longitudinal direction thereof to have an arc-like cross-section. The recess portion 217 has a width or length L1 that is greater than the width or length L2 of the pressure plate 216a or 217b. The width or length L1 of the recess portion 217 may have a dimension equal to or greater than the width or length of the pressure plate in its unfolded (i.e. pressed or flattened) state due to the pressing force of the associated bolt.

Figure 10:
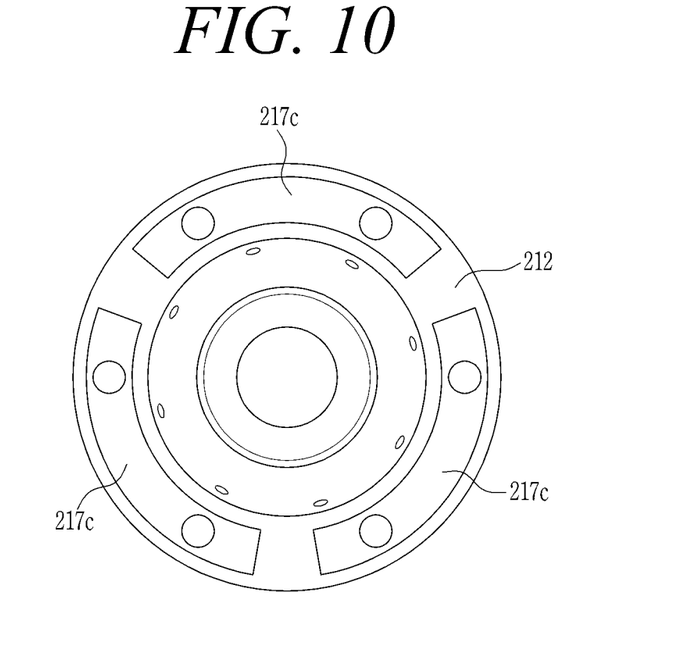
FIGS. 10 and 11 are views illustrating a modified example of the contact surface of the nozzle flange and the pressure plate in the fuel nozzle assembly according to the embodiment of the present disclosure.
Figure 11:
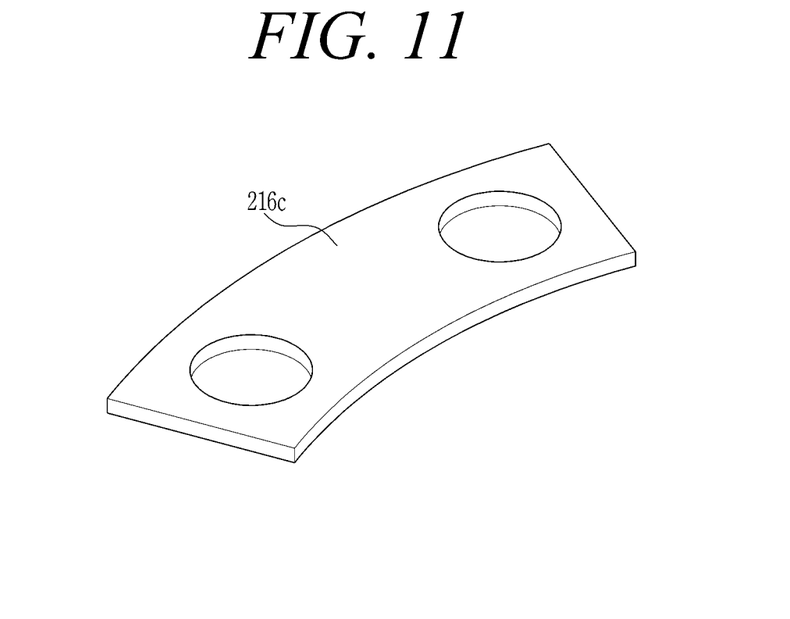

FIGS. 10 and 11 are views illustrating a modified example of the contact surface of the nozzle flange and the pressure plate in the fuel nozzle assembly according to the embodiment(s) of the present disclosure.

As illustrated in FIGS. 10 and 11, a pressure plate 216c extends such that an adjacent fixing bolt can be fitted thereto, and may double in size compared to the pressure plate to which only one fixing bolt is fitted. FIG. 10 illustrates an example in which a recess portion 217c for accommodating the associated pressure plate is formed on the flat surface (i.e. the bolt fastening surface) of the nozzle flange 212. FIG. 11 illustrates the pressure plate 216c accommodated in the recess portion 217c. The extension pressure plate 216c extending such that two or more bolts are fitted thereto enables a more uniform pressing force to be applied to the nozzle flange 212 while reducing an assembly time.

Figure 12:
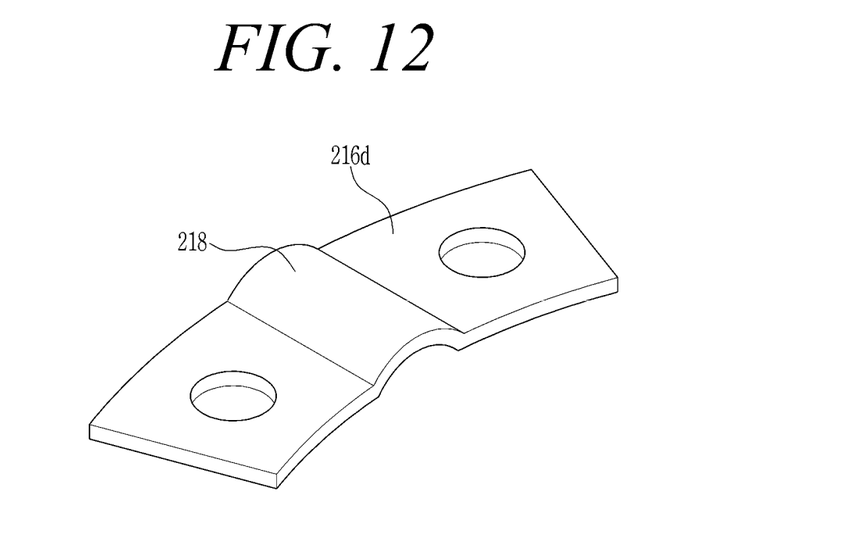
FIGS. 12 to 14 are views illustrating another modified example of the pressure plate in the fuel nozzle assembly according to the embodiment of the present disclosure.
Figure 13:
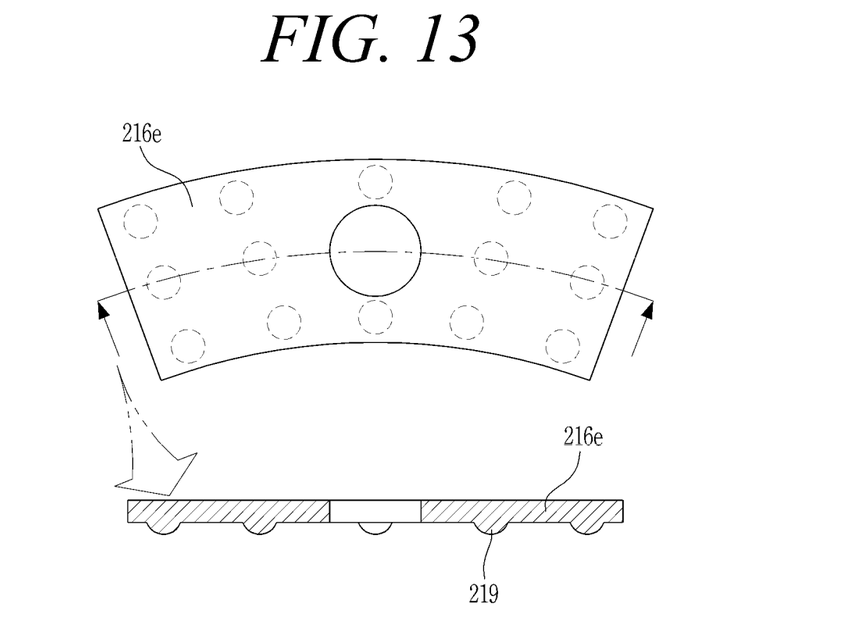
Figure 14:
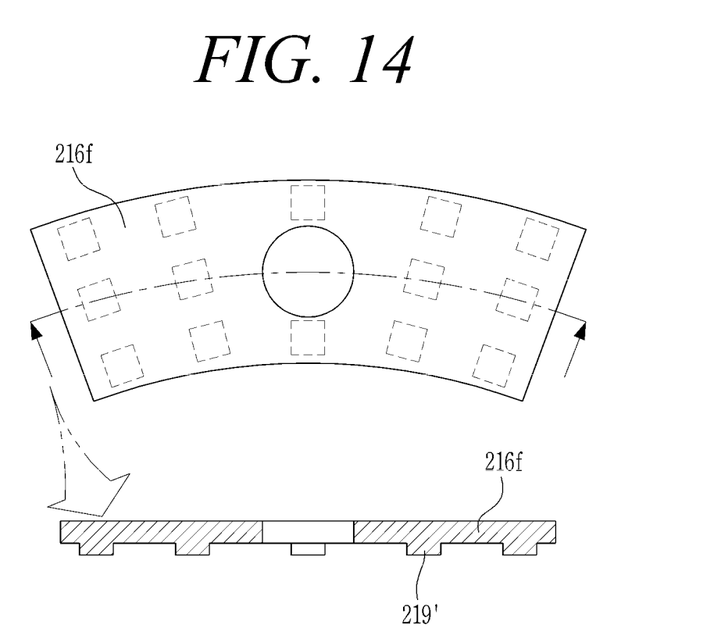

FIGS. 12 to 14 are views illustrating another modified example of the pressure plate in the fuel nozzle assembly according to the embodiment(s) of the present disclosure.

As illustrated in FIG. 12, a pressure plate 216d extends such that an adjacent fixing bolt can be fitted thereto, and the extension pressure plate 216d may have a bent portion 218 that is convex upward at the center thereof between the holes into which two adjacent fixing bolts are fitted. The bent portion 218 has an effect of easily absorbing any deformation of the extension pressure plate 216d caused by the pressing of the fixing bolts.

As illustrated in FIG. 13, a pressure plate 216e may have a plurality of circular protrusions 219 (or round bumps) formed on the (bottom or rear) surface thereof that is pressed against the nozzle flange. The pressure plate 216e formed with the circular protrusions 219 applies a more uniform pressing pressure throughout the nozzle flange 212 by increasing and uniformly distributing a local urging force.

As illustrated in FIG. 14, a pressure plate 216f may have a plurality of square protrusions 219' formed on the surface thereof pressed against the nozzle flange. The pressure plate 216f formed with the square protrusions 219' applies a more uniform pressing pressure throughout the nozzle flange 212 by increasing and uniformly distributing a local urging force.

As is apparent from the above description, in accordance with the exemplary embodiments of the present disclosure, the nozzle flange can be fastened to the head end plate with a uniform pressing pressure. Therefore, it is possible to enhance the durability and stability of the fuel nozzle assembly by improving the mechanical properties thereof.

The accompanying drawings, in these embodiments, and the present specification, merely that shows clearly some of the technical idea is also included in the present disclosure, to those skilled in the art to easily infer that within the scope of the technical ideas including the specification and drawings of the present disclosure various modifications and specific embodiments that will be apparent to all that is included in the scope of the present disclosure.

What is claimed is:

1. A fuel nozzle assembly comprising:
   a fuel nozzle;
   a head end plate to which the fuel nozzle is fixedly fastened; and
   a nozzle casing to which the head end plate is fixed, wherein the fuel nozzle comprises:
   an injection cylinder that supplies fuel to a combustion chamber and having a nozzle flange fixed to the head end plate; and
   a nozzle shroud separated from the injection cylinder to surround the injection cylinder and forming a passage between an inner wall of the nozzle shroud and the injection cylinder,
   the injection cylinder is fixedly fastened to the head end plate by a plurality of fixing bolts arranged in a circumferential direction of the nozzle flange, and
   each of the fixing bolts is fitted to at least one of a plurality of pressure plates to fixedly fasten the injection cylinder to the head end plate, the plurality of pressure plates having an extended curved shape in the circumferential direction of the nozzle flange, being arranged at regular intervals along the circumferential direction of the nozzle flange, and being pressed against a flat surface of the nozzle flange to which the fixing bolts are fastened.

2. The fuel nozzle assembly according to claim 1, wherein the nozzle flange has a recess portion formed on the flat surface thereof such that the at least one pressure plate is accommodated in the recess portion.

3. The fuel nozzle assembly according to claim 1, wherein the at least one pressure plate is an extension pressure plate extending circumferentially such that two or more adjacent fixing bolts are fitted thereto, and wherein the nozzle flange has a recess portion on the flat surface thereof such that the extension pressure plate is accommodated in the recess portion.

4. The fuel nozzle assembly according to claim 1, wherein the at least one pressure plate, prior to being secured to the flat surface of the nozzle flange, has a curved shape in a width direction thereof or in a longitudinal direction thereof to have an arc-like cross-section.

5. The fuel nozzle assembly according to claim 1, wherein:
   the nozzle flange has a recess portion formed on the flat surface thereof such that the at least one pressure plate is accommodated in the recess portion;
   the at least one pressure plate, prior to being secured, has a curved shape in a width direction thereof or in a longitudinal direction thereof to have an arc-like cross-section; and
   the recess portion has a width equal to or greater than the at least one pressure plate in a flattened state of the at least one pressure plate caused by a pressing force of an associated one of the fixing bolts.

6. The fuel nozzle assembly according to claim 1, wherein:
   the at least one pressure plate is an extension pressure plate extending circumferentially such that two or more adjacent fixing bolts are fitted thereto; and
   the extension pressure plate, prior to being secured, has a bent portion that is convex upward at the center thereof between two holes into which two adjacent fixing bolts are fitted.

7. The fuel nozzle assembly according to claim 1, wherein the at least one pressure plate has a plurality of circular protrusions or square protrusions formed on the surface that is pressed against the nozzle flange.

8. The fuel nozzle assembly according to claim 1, wherein the fuel nozzle comprises an inner fuel nozzle disposed at the center of the head end plate, and a plurality of outer fuel nozzles arranged radially around the inner fuel nozzle.

9. The fuel nozzle assembly according to claim 1, wherein:
   the fuel nozzle comprises an inner fuel nozzle disposed at the center of the head end plate, and a plurality of outer fuel nozzles arranged radially around the inner fuel nozzle; and
   the outer fuel nozzles are different-sized modules that are circumferentially arranged, wherein the different-sized modules of the outer fuel nozzles are disposed at different radial positions from the center of the head end plate.

10. A gas turbine comprising:
    a compressor to compress air;
    a combustor comprising a fuel nozzle assembly to mix compressed air supplied from the compressor with fuel for combustion; and
    a turbine to generate power by gas combusted in the combustor, wherein the fuel nozzle assembly comprises:
    a fuel nozzle;
    a head end plate to which the fuel nozzle is fixedly fastened; and
    a nozzle casing to which the head end plate is fixed, and wherein the fuel nozzle comprises:
    an injection cylinder that supplies fuel to a combustion chamber and having a nozzle flange fixed to the head end plate; and
    a nozzle shroud separated from the injection cylinder to surround the injection cylinder and forming a passage between an inner wall of the nozzle shroud and the injection cylinder,
    the injection cylinder is fixedly fastened to the head end plate by a plurality of fixing bolts arranged in a circumferential direction of the nozzle flange, and
    each of the fixing bolts is fitted to at least one of a plurality of pressure plates to fixedly fasten the injection cylinder to the head end plate, the plurality of pressure plates having an extended curved shape in the circumferential direction of the nozzle flange, being arranged at regular intervals along the circumferential direction of the nozzle flange, and being pressed against a flat surface of the nozzle flange to which the fixing bolts are fastened,
    wherein the nozzle flange has a recess portion on the flat surface thereof and having a shape that accommodates the pressure plate.

11. The gas turbine according to claim 10, wherein the fuel nozzle comprises:

an inner fuel nozzle disposed at the center of the head end plate; and a plurality of outer fuel nozzles arranged radially around the inner fuel nozzle.

12. The gas turbine according to claim 10, wherein the at least one pressure plate is an extension pressure plate extending circumferentially such that two or more adjacent fixing bolts are fitted thereto.

13. The gas turbine according to claim 10, wherein:

the nozzle flange has the recess portion formed on the flat surface thereof such that the at least one pressure plate is accommodated in the recess portion;

the at least one pressure plate, prior to being secured, has a curved shape in a width direction thereof or in a longitudinal direction thereof to have an arc-like cross-section; and the recess portion has a width equal to or greater than the at least one pressure plate in a flattened state of the at least one pressure plate caused by a pressing force of an associated one of the fixing bolts.

14. The gas turbine according to claim 10, wherein:

the at least one pressure plate is an extension pressure plate extending circumferentially such that two or more adjacent fixing bolts are fitted thereto; and the extension pressure plate, prior to being secured, has a bent portion that is convex upward at the center thereof between two holes into which two adjacent fixing bolts are fitted.

15. An apparatus comprising:

a combustor comprising a fuel nozzle assembly adapted to mix compressed air with fuel to achieve gas combustion thereof; and a turbine adapted to generate power using the gas combustion from the combustor, the fuel nozzle assembly comprised of, a casing and an injection cylinder, which supplies fuel to a combustion chamber in the combustor, having a nozzle flange attached to a head end plate of the casing by means of fixing bolts arranged circumferentially along the nozzle flange, wherein at least one fixing bolt engages with an opening in at least one pressure plate of a plurality of pressure plates, the at least one pressure plate having particular length and width configurations that conform with an arc along a circumferential edge of the nozzle flange to distribute, in a uniform manner, pressure applied from the fixing bolt being biased against a surface of the nozzle flange to secure the injection cylinder with the head end plate of the casing.

16. The apparatus of claim 15, wherein the at least one pressure plate has a lengthwise curvature that matches the arc along the circumferential edge of the nozzle flange.

17. The apparatus of claim 16, wherein the nozzle flange has at least one recessed portion with dimensions that correspond to the particular length and width configurations including the lengthwise curvature of the at least one pressure plate.

18. The apparatus of claim 17, wherein the at least one pressure plate, prior to being secured, has a non-flat configuration due to a curved arc-like cross-section or due to a concave/convex portion to further accommodate a bias force from the fixing bolt.

19. The apparatus of claim 17, wherein the at least one pressure plate has two spaced apart openings that allow engagement with a pair of fixing bolts.

20. The apparatus of claim 17, wherein the at least one pressure plate has a plurality of spaced apart protrusions that contact with the nozzle flange to provide additional uniform distribution of the pressure applied from the fixing bolt.

* * * * *